Jan. 13, 1970   J. G. LEWIS   3,489,934
DYNAMO-ELECTRIC MACHINE END SHIELD ARRANGEMENT
Filed Aug. 9, 1968   3 Sheets-Sheet 3
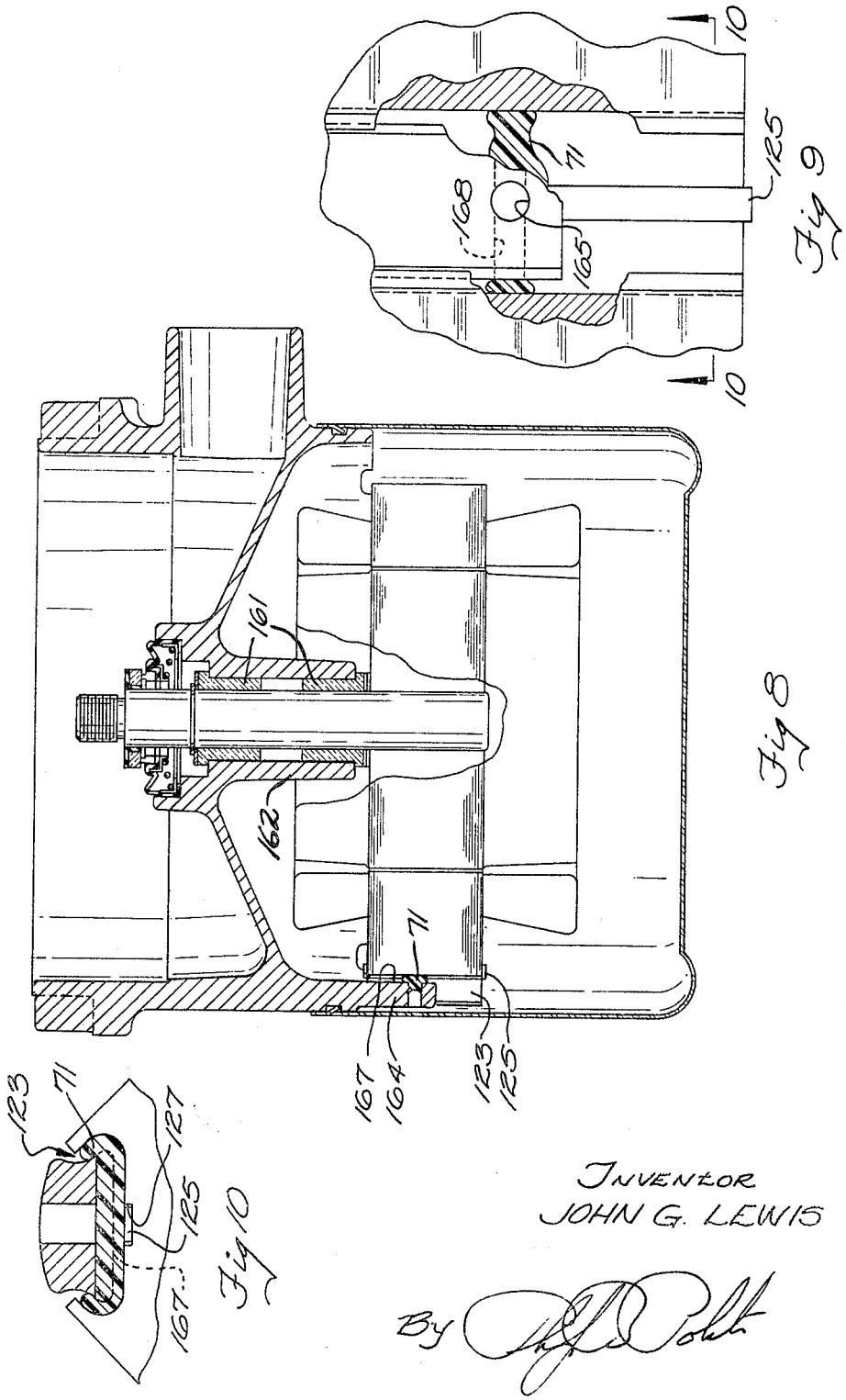
INVENTOR
JOHN G. LEWIS
ATTORNEY United States Patent Office 3,489,934
Patented Jan. 13, 1970

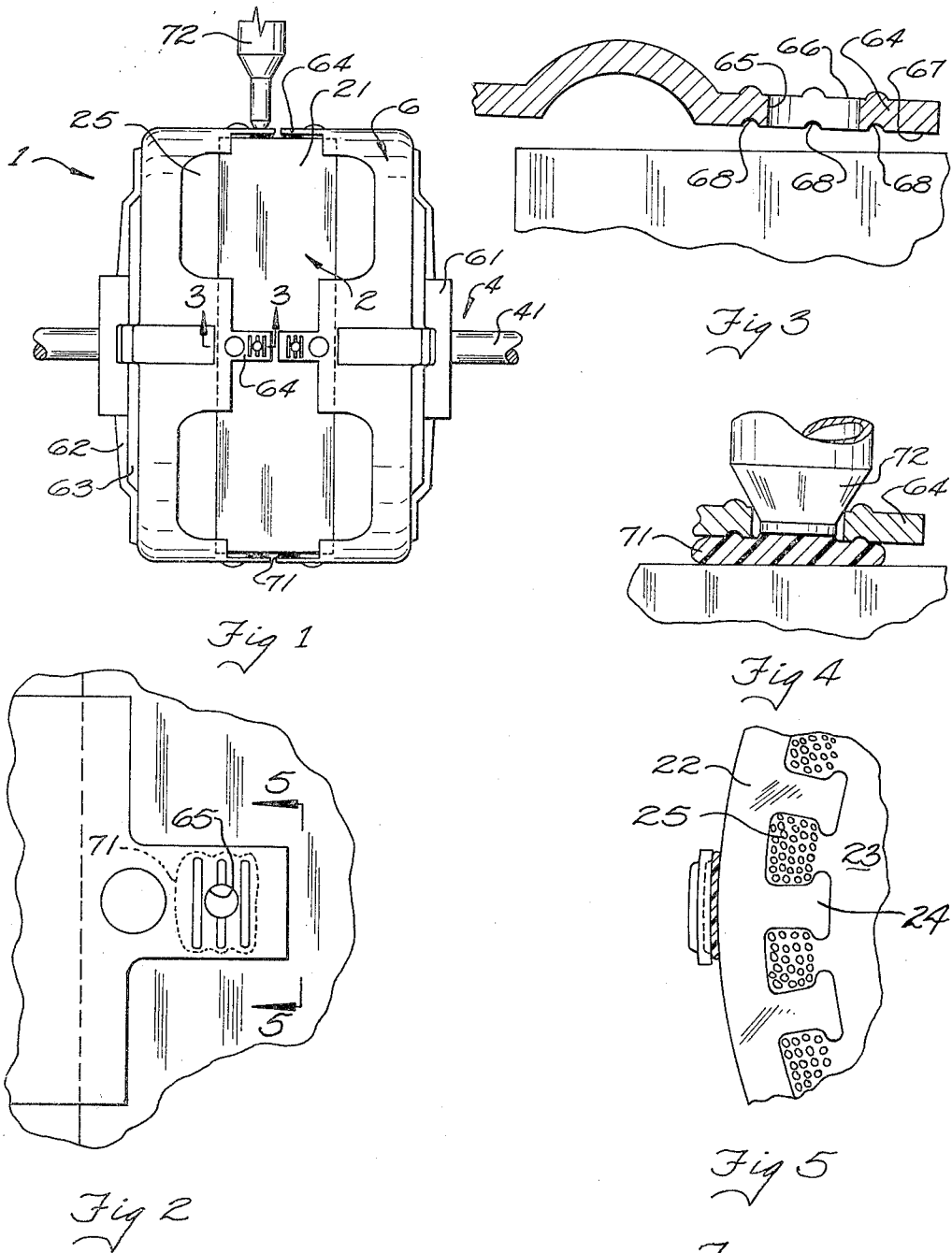

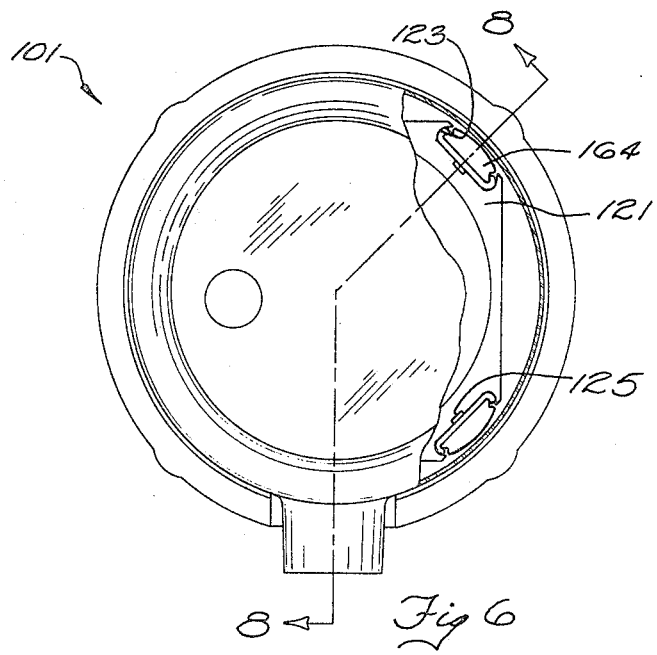
Fig 6
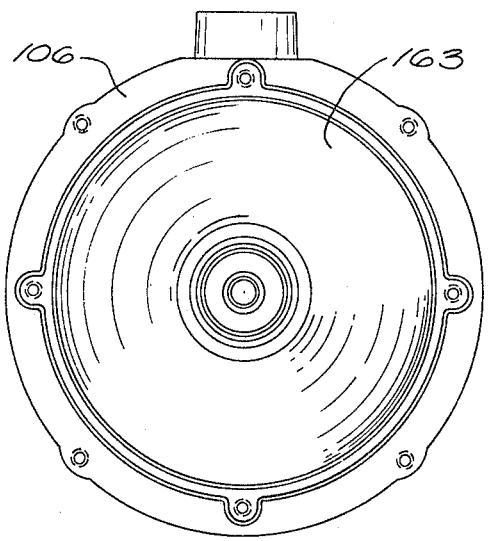
Fig 7
INVENTOR
JOHN G. LEWIS
By 
ATTORNEY

3,489,934
DYNAMO-ELECTRIC MACHINE END
SHIELD ARRANGEMENT
John G. Lewis, St. Louis County, Mo., assignor to
Emerson Electric Co., St. Louis, Mo., a corporation of Missouri
Filed Aug. 9, 1968, Ser. No. 751,595
Inc. Cl. H02k 5/00, 15/14
U.S. Cl. 310—43          7 Claims

ABSTRACT OF THE DISCLOSURE

An electric motor having a laminated stator core, a pair of formed steel end shields cemented to the stator core, and a rotor journaled in the end shields. The end shields have axially extending mounting tabs. Each mounting tab has a hole through it from the outside to an interior face of the tab and a set of depressions in that inner face. An adhesive injected through the hole in the tab spreads smoothly between the stator core and the inner face of the tab and into the depressions in the inner face of the tab. A second embodiment of motor has a single cast aluminum end shield having tabs cemented into grooves at corners of a square laminated stator. Each tab has a hole through it into a single transverse depression on its radially inner face. Some of the adhesive injected into the hole escapes through the depression into the space between the tab and the side of the groove.

Background of the invention

This invention relates to dynamo-electric machines having end shields which support bearings for a rotor. The invention is described as applied to electric motors, but its utility is not limited thereto.

Modern adhesives, such as epoxy resins, are now widely used for cementing the end shields of electric motors to some part of the motor stator, such as the stator core or a casing around the core. The motor is assembled with thin removable shims between the rotor and the stator core and thereafter an adhesive between the stator part and the end shield is allowed to set. The adhesive is variously applied before or after the motor is assembled. When the adhesive has set, the shims are removed through openings in the end shield.

Various cementing techniques have been used. However, all suffer from one or more drawbacks. Presently known techniques not only use more adhesive than necessary, but also fail to insure that the adhesive is placed to do the most efficient job of holding the end shield to the stator. In particular, no presently known technique successfully places the adhesive between relatively broad flat surfaces of the stator and end shield. Furthermore, present techniques waste a considerable amount of adhesive. Because of the high cost of the adhesives used, it is highly desirable to reduce this waste as much as possible.

A further problem in cementing motor end shields to stators is the lack of uniformity in the strength of the bond. If the adhesive is placed on one of the parts before the end shield is pushed onto (or into) the stator, it tends to be wiped off on at least one side during this operation. If, on the other hand, the adhesive is not applied until after the parts are aligned, uniform spreading of the adhesive has been difficult to achieve and it has been difficult to determine whether the adhesive has bonded with any substantial area of opposing faces of the parts being cemented. Also, if the stator or end shield is not perfectly clean, the adhesive does not bond to it and the end shield is easily pulled off. These defects are not easily detected visually.

In certain application electric motors are suspended vertically from one of their end shields. Because of the problems set out and because cemented joints cannot withstand strong "peel" forces, which are exerted on them unless some part of the joint is in compression at all times, the use of cemented motors in such applications has been thought impractical.

The problems with presently known approaches can be appreciated better by reference to some of the constructions described in the literature. One construction in which the adhesive is applied before the parts are assembled is described in United States Patent No. 3,343,013 to Wightman et al. The Wightman et al. expedient of tapering the end shield mounting tabs reduces considerably the problem of pushing the entire bed of epoxy ahead of the tab when the end shield is positioned along the stator. However, it does not totally solve the problem of holding in place a "dirty" end shield. Thompson et al., No. 3,165,816, indicate that in their preferred method the adhesive is applied between the end shield and the stator after the parts have been assembled, but no special provision for applying the adhesive is made and the adhesive is apparently applied around the edges of the end shield. Therefore, a large proportion of the adhesive will tend to escape from the space between the end shield and the stator before a substantial quantity fills the space between these two parts. Uniformity of the joints formed by this procedure is virtually unobtainable, and any dirt on the end shield is likely to destroy the bond completely. Another approach, designed specifically for injecting the adhesive after the end shield and stator are assembled is disclosed by Frazier et al., No. 3,300,666. This approach involves the use of a stator shell which extends axially beyond the stator core. End shields are fitted telescopically into the ends of the shell and are bonded to the shell by an adhesive injected through eight holes spaced around each axial end of the shell. Small square projections are positioned on the end shield periphery adjacent the holes in the shell. Although this construction has advantages over those of Thompson et al., it also is not entirely satisfactory. It requires the use of a stator shell, careful alignment of the shell and end shield both axially and rotationally, leaving a relatively large gap between the shell and the perimeter of the end shield, and applying adhesive at a large number of positions to reinforce the structural weaknesses of the shell construction. It therefore requires a relatively large quantity of adhesive and wastes still more adhesive in forming buttons of adhesive on the outer surface of the stator shell. Because the paths of least resistance for the adhesive are the axially outer and inner sides of the end shield, rather than around its periphery, forming a bond along any substantial surface of the shell or end shield periphery is difficult. The adhesive is likewise unlikely to fill in closely around the protrusions on the end shield. Even with adhesive applied in eight positions at each end, the shell has very little resistance to distortion caused by pressure on a side of a motor between two of the positions, as for example if the motor were bumped in transit or in installation. The shell would act as a toggle, thereby tending to peel the adhesive from the shell. Because adhesives have very little resistance to peeling, a blow of this sort could well loosen the end shield and destroy the motor. The use of a motor such as that disclosed by Frazier et al. in a vertical position, suspended from one end shield, would also be unsatisfactory because of the chance that the adhesive bond would fail because of dirty parts, a blow, or vibration. Perfect alignment of the bearing would then be lost, immediately if the end shield projections were not completely covered with adhesive, or after a short time as the relatively sharp edges of the holes in the shell cut into the thin necks of epoxy filling the holes.

One of the objects of this invention is to provide a dynamo-electric machine having an end shield and a stator held together by an adhesive in which the adhesive is more efficiently utilized and more predictably applied than in presently known cemented motors.

Another object is to provide such an assembly in which the bond between the end shield and stator is far stronger than in presently known devices, especially in resisting axial forces, even if the parts are not perfectly clean.

Other objects will become apparent to those skilled in the art in the light of the following description and accompanying drawings.

Summary of the invention

In accordance with this invention, generally stated, a dynamo-electric machine is provided with end shields having axially projecting mounting tabs, each of which has a hole in it extending to a radially inner face of the tab. Each tab is bonded to a stator part, preferably an unmachined portion of a laminated stator core, by an adhesive injected between the tab and the stator core through the hole in the tab. A depression on an inner face of each tab accepts some of the injected adhesive. Preferably, the hole through the tab extends into the depression to insure that the adhesive fills the depression and to aid in uniform distribution of the adhesive between the tab and the stator core.

This construction provides a relatively thin, broad expanse of adhesive. Furthermore, because the bonding surface of the laminated core is not perfectly smooth and the successive laminations have minute spaces between them along the bonding surface the adhesive holds both bonding surfaces not only by adhesion but by mechanical interference.

Brief description of the drawings

In the drawings:

FIGURE 1 is a view in side elevation of one illustrative embodiment of electric motor embodying the end shield assembly of this invention;

FIGURE 2 is a detail in front elevation of an end shield mounting tab of the electric motor shown in FIGURE 1;

FIGURE 3 is a fragmentary sectional view taken along the line 3—3 of FIGURE 1, showing the tab and stator core before injection of an adhesive;

FIGURE 4 is a fragmentary sectional view corresponding to FIGURE 3, after injection of an adhesive by a nozzle, but before the nozzle is removed.

FIGURE 5 is a sectional view taken along the line 5—5 of FIGURE 2;

FIGURE 6 is a bottom plan view, partly cut away, of a second embodiment of electric motor embodying the end shield assembly of this invention;

FIGURE 7 is a top plan view of the electric motor shown in FIGURE 6;

FIGURE 8 is a sectional view taken along the line 8—8 of FIGURE 6;

FIGURE 9 is a detail in front elevation of an end shield mounting tab of the electric motor shown in FIGURE 6; and FIGURE 10 is a fragmentary sectional view taken along the line 10—10 of FIGURE 9.

Description of the preferred embodiments

Referring now to the drawings, and in particular to FIGURES 1–5, reference numeral 1 indicates an AC induction motor including an end shield assembly of this invention. The motor 1 includes a stator 2, a rotor assembly 4 and end shields 6.

The stator 2 includes a stator core 21 made up of a multiplicity of identical round, flat laminations 22. The laminations 22 are secured face to face in axial alignment to define an axial rotor bore 23 surrounded by stator teeth 24 around which coils 25 are wound.

The rotor assembly 4 includes a rotor shaft 41 journaled in bearings 61 mounted in the end shields 6.

In this illustrative embodiment the end shield 6 is formed from sheet steel and has axially extending mounting tabs 64 at its four beveled corners. The mounting tabs 64 overlap, and are radially spaced somewhat from, the laminated stator core 21. Each of the mounting tabs 64 has a hole 65 extending through it from a radially outer face 66 to a radially inner face 67 of the tab 64. The races 66 and 67 of the tab 64 are bowed slightly to conform to the contour of the outer face of the stator core 21. The hold 65 is positioned axially over the stator core 21. On the radially inner face 67 of the tab 64 are three stamped depressions 68. The depressions 68 are relatively narrow, and extend parallel to the interfaces of the stator laminations 22. By way of example, if each tab 64 has a lateral width of eleven sixteenths of an inch, each depression 68 may be semicircular in transverse section and have a radius of one sixty-fourth of an inch and a length of three-eights of an inch. The hole 65 extends through the central depression 68 but is spaced slightly from the other depressions 68.

Around the bearing 61 in each end shield 6 is a support web 62 having apertures 63 through it.

In the manufacture of this illustrative embodiment of motor 1 the stator 2, rotor 4 and end shields 6 are assembled in a standard manner to obtain a uniform air gap between the rotor 4 and the stator bore 23 and a concentric fit between the rotor shaft 41 and the end shield bearings 61, such as by shimming the rotor in the stator bore 23. An adhesive, such as a thermosetting epoxy resin 71, is injected by a nozzle 72 through the hole 65 in each tab 64 into the space between the tab 64 and the laminated stator core 21. The nozzle 72 preferably extends into the hole 65 and forms a tight fit with the upper edge of the hole 65. Therefore, little epoxy resin 71 remains in the hole 65 when the nozzle 72 is removed. The epoxy resin 71 is a thick, viscous material which oozes outwardly from the hole 65. The viscosity of the epoxy resin 71 insures that it spreads outwardly at least some distance in all directions from the hole 65, contacting a relatively broad surface of the stator core 22 and the tab 64. Because the central depression 68 is necessarily the initial path at least ressitance, it is filled first. Likewise, the proximity of the other depressions 68 to the hole 65 makes them also paths of low resistance to flow and assures their being filled.

After a predetermined quantity of the epoxy resin 71 has been injected through each hole 65, the epoxy 71 is cured by heating and the shims removed.

It will be seen that the adhesive is placed most efficiently for holding the end shield 6 to the stator 2. In fact, no adhesive at all need extend beyond the periphery of the tab 64, as has been necessary when methods known heretofore have been used to assemble cemented motors. Therefore, a motor is provided which is both neater and cheaper than those presently available. Furthermore, the strength of the bond against axial forces is greatly enhanced, so that the motor can be suspended from one end shield even if the end shield was not thoroughly cleaned before cementing.

The end shield assembly of this invention may, of course, be applied to numerous varieties of motors. For example, in the embodiment shown in FIGURES 6–10, an impeller motor 101, which may be used in a garbage disposer, is provided having a round cast aluminum upper end shield 106 having a pair of bearings 161 pressed into the ends of a neck section 162 below an impeller cavity 163. Integral mounting tabs 164 on the end shield 106 fit loosely into channels 123 at the corners of a laminated stator core 121. The laminations of the stator core 121 are held together by thin metal straps 125 lying in shallow grooves 127 along the centers of the radially inner walls of the channels 123. Near the free end of each mounting tab 164 is a hole 165 extending through the mounting tab 164. At the axial position of the hole 165 the radially inner face 167 of the tab 164 is milled transversely from edge to edge. Thus, a depression 168 is formed all the way across the radially inner face 167 of the tab 164. The depression 168 may be, for example, one eighth of an inch wide and three thirty-seconds of an inch deep.

This embodiment of motor 101 is assembled in the same way as the first illustrative embodiment. When, however, the adhesive 71 is injected into each hole 165 of this embodiment, some of it flows laterally outward from the open ends of the depression 168 and into the space between the tab 164 and the side walls of the channel 123. Because this adhesive contacts both lateral faces of each tab 164 and the side walls of each channel 123, rotational forces on the tabs 164 exert only compressive forces on the adhesive. The stator lamination-holding straps 125, as well as the tabs 164, are bonded by the adhesive 71 to the laminated stator 121. A considerable area of each tab 164 is also bonded directly to the laminated stator core 121, outboard of the strap 125.

Numerous variations of the end shield assembly of this invention, within the scope of the appended claims, will occur to those skilled in the art in the light of the foregoing disclosure. For example, the mounting tabs on the end shield may be made much smaller or much larger than those of the illustrative embodiments described herein. Although depressions running parallel to the stator laminations are preferred, other shaped depressions may be utilized on the radially inner faces of the tabs. Although the depressions preferably extend radially outward from smooth faces of the tabs, they may be defined by radially inwardly extending protrusions on the radially inward faces of the tabs. Although stator laminae form an ideal bonding surface, a solid stator or another stator part may also be used as a bonding surface if it is provided with a depression or other discontinuity. These variations are merely illustrative.

Having thus described the invention, what is claimed and desired to be secured by Letters Patent is:

1. In a dynamo-electric machine having a laminated stator core, an end shield and a cementing composition bonding said end shield to said laminated stator core, the improvement comprising axially projecting mounting tabs connected to said end shield, said mounting tabs being adapted to encompass at least a part of said laminated stator core, each of said tabs having an aperture extending through said tab to a radially inner face of said tab, said aperture forming a passage through which said cementing composition may be injected, during manufacture of said dynamo-electric machine, between said tab and said laminated core, and at least one depression on said radially inner face of said tab, said cementing composition contacting both said laminated stator core and said radially inner face of said tab and extending into said depression on said inner face of said tab.

2. The improvement of claim 1 wherein said aperture in each of said tabs extends through a portion of said depression.

3. The improvement of claim 1 wherein said depression in each of said tabs is elongate and has its long axis aligned substantially parallel to interfaces of said laminated stator core.

4. The improvement of claim 3 wherein said depression extends to a lateral side of said tab.

5. The improvement of claim 4 including channels in said laminated stator core, said channels having bottom and side walls, said tabs extending into said channels free of direct contact with said channels, said cementing composition spreading through said channel into the space between the lateral side of said tab and the side wall of said chanel and contacting the lateral side of said tab and the side wall of said channel.

6. In a dynamo-electric machine having a stator, an end shield, mounting tabs connected to said end shield, said mounting tabs encompassing at least a part of said stator and being spaced therefrom, the improvement comprising a hole through each of said mounting tabs and an adhesive spreading outwardly from said hole between said mounting tab and said stator.

7. The improvement of claim 6 wherein adjacent broad surfaces of said tabs and said stator are bonded together by said adhesive, each of said surfaces being provided with at least one interruption.

References Cited

UNITED STATES PATENTS

| | | | |
|---|---|---|---|
| 3,165,816 | 1/1965 | Thompson et al. | 310—42 X |
| 3,300,666 | 1/1967 | Frazier et al. | 310—42 |
| 3,343,013 | 9/1967 | Wightman et al. | 310—42 |
| 3,378,709 | 4/1968 | Royer et al. | 310—90 |
| 3,437,853 | 4/1969 | Arnold | 310—42 |

WARREN E. RAY, Primary Examiner

U.S. Cl. X.R.

310—89